United States Patent [19]

Eichhorn et al.

[11] Patent Number: 5,356,725

[45] Date of Patent: Oct. 18, 1994

[54] CORROSION-RESISTANT ALUMINUM ALLOY BRAZING COMPOSITE

[75] Inventors: Edgar G. Eichhorn; Arthur C. Scott, both of Livermore, Calif.

[73] Assignee: Kaiser Aluminum & Chemical Corporation, Pleasanton, Calif.

[21] Appl. No.: 118,272

[22] Filed: Sep. 9, 1993

[51] Int. Cl.$^5$ .................. B32B 15/20; F28F 21/08
[52] U.S. Cl. ........................ 428/654; 165/905
[58] Field of Search ............. 428/654, 607; 165/180, 165/905, 134.1

[56] References Cited

U.S. PATENT DOCUMENTS

| | | | |
|---|---|---|---|
| 3,843,333 | 10/1974 | Woods | 428/654 |
| 4,203,490 | 5/1980 | Terai et al. | 428/654 |
| 4,317,484 | 3/1982 | Tamake et al. | 428/654 |
| 4,357,397 | 11/1982 | Baba et al. | 428/654 |
| 4,489,140 | 12/1984 | Pulliam et al. | 428/654 |
| 4,574,878 | 3/1986 | Sugiyama et al. | 165/134.1 |
| 4,636,356 | 1/1987 | Iwasaki et al. | 420/532 |
| 4,906,534 | 3/1990 | Bekki et al. | 428/654 |
| 4,991,647 | 2/1991 | Kawabe et al. | 165/134.1 |
| 5,041,343 | 8/1991 | Fortin et al. | 428/654 |

*Primary Examiner*—John Zimmerman
*Attorney, Agent, or Firm*—Andrew E. Barlay

[57] ABSTRACT

A novel aluminum alloy brazing composition is provided consisting of a core alloy consisting of a core alloy and a cladding on at least one side of the core alloy and wherein the core alloy consists essentially of manganese from about 0.8 to about 1.5%, silicon from about 0.45 to about 0.75%, titanium from about 0.03 to about 0.1%, a combined magnesium, copper and zinc content not in excess of about 0.15%, an iron content not in excess of about 0.3%, the total quantity of other impurities not exceeding about 0.15%, balance aluminum; and wherein the cladding consists of an AA 4XXX series aluminum alloy. The aluminum alloy brazing composition can be employed in the brazing of evaporators such as plate-fin evaporators utilized in the automotive field.

6 Claims, No Drawings

CORROSION-RESISTANT ALUMINUM ALLOY BRAZING COMPOSITE

BACKGROUND OF THE INVENTION

Aluminum brazing sheet products, commonly utilized in the manufacture of evaporators, are currently made from composites utilizing an Aluminum Association (AA) 3XXX-type aluminum alloy core clad with a brazing alloy, such as an AA 4XXX series alloy, for example 4104 or 4047 aluminum alloy. Typical core alloys presently used for evaporator applications include aluminum alloys designated as AA 3003, 3005 and 3105. The conventional design of plate-fin evaporators requires the use of a sheet product which possesses good formability due to the cold working operations it has to undergo during the manufacture of the evaporators. This good formability is imparted to the sheet product by generally subjecting it to a soft annealing heat-treatment (O-temper). While subjecting the sheet product to the required heat-treatment produces the desired formability, when the heat-treated sheet product is subsequently cold worked, for example stamped, such cold-working detrimentally affects the physical and mechanical properties of the sheet product, for example the corrosion resistance and the filler metal flow during brazing. It is therefore of major importance to provide a brazing sheet product for evaporator applications which, besides good mechanical formability, also exhibits superior corrosion resistance and brazeability. It has now been discovered that clad brazing sheet products of significantly improved corrosion resistance and brazeability can be produced when the novel alloy of the present invention is employed as the core alloy for the aluminum alloy brazing sheet composite. The novel core alloy for the brazing sheet product is characterized by a manganese content from about 0.8% to about 1.5%, a silicon content within the range from about 0.45% to about 0.75%, a titanium content within the range from about 0.03% to about 0.10% and a combined magnesium, copper and zinc content not exceeding about 0.15%, an iron level not in excess of about 0.3%, unavoidable impurities not exceeding a total of about 0.15%, balance aluminum (all percentages given are weight percents and are based on the total weight of the core alloy).

SUMMARY OF THE INVENTION

An object of the present invention is to provide a novel brazing sheet product for use in the manufacture of evaporators. More specifically, the present invention concerns a brazing sheet product possessing significantly increased corrosion resistance and reduced core alloy dissolution while simultaneously exhibiting improved filler metal flow during brazing. The aforementioned properties are achieved by providing a novel aluminum alloy for the core of the brazing sheet product, the novel core alloy being characterized by a manganese (Mn) content from about 0.8% to about 1.5%, a silicon (Si) content from about 0.45% to about 0.75%, a titanium (Ti) content from about 0.03 to about 0.1%, a combined magnesium (Mg)+copper (Cu)+zinc (Zn) content not in excess of about 0.15%, an iron (Fe) content not in excess of about 0.3%, total quantity of impurities not in excess of 0.15%, balance aluminum (Al). The cladding on the core alloy is selected from 4XXX alloys having a high Si content, for example AA 4104, 4147 or 4047 aluminum alloys are used. The typical 4XXX alloys used for cladding generally contain Si from about 5.0 to about 13%, Fe up to about 0.8%, Cu up to about 0.3%, Mn up to about 0.15%, Mg in the range from about 0.1 to about 2.0%, Zn up to about 0.20%, others each 0.05% with a total of 0.15%, balance Al.

DETAILED DESCRIPTION OF THE INVENTION

This invention relates to a novel aluminum alloy brazing sheet product for evaporators. More particularly, this invention relates to an aluminum alloy brazing sheet product having a novel, highly corrosion resistant core alloy which core alloy is clad with an AA 4XXX aluminum alloy cladding. The novel core alloy of the invention consist essentially of Mn in the range from about 0.8 to about 1.50%, Si in the range from about 0.45 to about 0.75%, Ti in the range from about 0.03% to about 0.10%, a combined Mg+Cu+Zn content not exceeding 0.15%, an Fe content not exceeding about 0.3%, impurities in a total quantity up to about 0.15%, balance Al. Preferably, the novel core alloy contains Ti in the range from about 0.03% to about 0.07%, the combined Mg+Cu+Zn content does not exceed 0.10% and the impurity content is limited to 0.10%, balance Al.

The brazing sheet cladding applied to the novel core alloy is selected from the 4XXX series alloys. Suitable 4XXX series alloys include the following 4XXX series alloys: 4045, 4047, 4104, 4147 and 4343. The preferred 4XXX brazing sheet alloys are selected from 4047, 4147 and 4104 alloys. The 4XXX brazing alloys which are employed as cladding for the novel Al core alloy, generally have the following compositional ranges: Si 5.0–11%, Fe up to about 0.8%, Cu below about 0.5%, Mn about 0.15% or below, Mg from about 0.1 to about 2.0%, Zn about 0.20, Ti about 0.20, total impurities 0.15%, remainder Al.

The cladding can be applied to one or both sides of the core alloy by conventional methods, for example by hot rolling of the cladding sheet to the core alloy. The temperature and the length of the time involved in the hot rolling is usually carefully controlled to avoid excessive diffusion of the core alloying elements into the cladding or vica-versa. Preferred hot rolling conditions depend on the thickness of the cladding layer and are well-known in the art. The clad composite is then subjected to a conventional annealing treatment (O-temper) which consists of heating the brazing sheet product to about 720° F., followed by slow cooling to room temperature at a rate of about 50° F. per hour.

The aluminum brazing sheet product or composite of the invention can then be readily employed in the manufacture of plate-fin evaporators, such as air conditioning evaporators commonly utilized in automobiles. The novel brazing sheet product exhibits decreased sensitivity to the effects of cold working, such as stamping which is commonly employed in the manufacture of evaporators, hence less variability in brazing performance and serviceability is achieved. The novel aluminum brazing sheet product also exhibits superior brazeability and corrosion resistance in comparison to the conventional brazing sheet products previously used in evaporator manufacturing.

The following examples are provided to show the excellent corrosion resistance and improved brazeability of the novel brazing sheet product. For comparison, commercially available brazing sheet composites, based on conventional AA 3XXX alloys clad with AA 4XXX brazing alloy were also tested.

EXAMPLE 1

In order to test the corrosion resistance of the novel brazing sheet product versus the corrosion resistance of conventional brazing sheet products, test coupons of 0.020 inch (0.508 mm) thickness were prepared from both the novel and the conventional brazing sheet products. Cladding for each test coupon, regardless of the core alloy composition, was a 4147 aluminum alloy which was applied to both sides of the core alloy, while the core alloy compositions were selected from alloy compositions within the inventive range and from commercial core alloy compositions. The test coupons were all vacuum brazed prepared in the same manner and were then subjected to SWAAT corrosion testing in accordance with the ASTM G85:A3 method. The results of the SWAAT corrosion tests are reported in Table I.

TABLE I

Corrosion Resistance of Brazing Sheet Composites

| SAMPLE NO. | COMPOSITION OF CORE ALLOYS* | | | | | | HRS. TO PERFORATION |
|---|---|---|---|---|---|---|---|
| | Mn | Si | Fe | Mg | Cu | Al | |
| 1** | 1.1 | 0.6 | 0.7 | 0.5 | 0.3 | bal. | 96 |
| 2** | 0.8 | 0.15 | 0.27 | 0.5 | 0.5 | bal. | 72 |
| 3*** | 1.09 | 0.69 | 0.26 | — | 0.02 | bal. | 550 |
| 4*** | 1.1 | 0.54 | 0.09 | — | 0.01 | bal. | 600 |
| 5*** | 1.3 | 0.6 | 0.08 | — | 0.01 | bal. | 600 |

* = in weight % based on the total weight of the core alloy
** = conventional commercial alloy
*** = core alloys of the invention

EXAMPLE 2

The brazeability of the aluminum alloy brazing sheet composites shown in Table 1 was also determined by comparing the braze metal flow for each of the compositions described. Brazeability was determined by vacuum brazing coupons made from the composites and by measuring the amount of filler alloy that melted and flowed to the lower edge of each of the coupons brazed in a vertical position. Each coupon had a size of 2 3/16 by 4 ⅞ inches and the coupons were suspended and brazed with the shorter of the two dimensions being vertical. After brazing the bottom 0.5 inch of each coupon was sheared and weighed. For comparison purposes a blank and unbrazed coupon was also sheared and weighed. From the weight difference between the blank and each of the brazed coupons the amount of filler metal that melted and flowed to the lower end of the coupons was calculated and expressed as a percent of total amount of filler available for melting and flow.

The higher the calculated percentage, the higher the quantity of metal available for brazing and thus for bonding of the parts of plate-fin evaporators. The results obtained in the brazeability tests were tabulated and are shown in Table II.

TABLE II

| | Filler Metal Flow in Brazeability Test |
|---|---|
| SAMPLE | Filler Metal Flow in % |
| 1* | 28 |
| 2* | 47 |
| 3** | 76 |
| 4** | 77 |
| 5** | 73 |

* = conventional core alloy compositions
** = novel core alloy compositions

From the Tables it can be clearly observed that the aluminum alloy brazing products based on the novel core alloy have significantly improved corrosion resistance and also excellent brazeability.

In addition to the significantly improved corrosion resistance and brazeability, the composites based on the novel core alloy also exhibit the same high degree of formability and post-braze strength expected from brazing composites with conventional core alloys having the same or similar claddings.

What is claimed is:

1. An aluminum alloy brazing composite consisting of an aluminum alloy core and an aluminum alloy cladding on at least one side of the core, wherein the core alloy consists essentially of manganese from about 0.8 to about 1.5%, silicon from about 0.45 to about 0.75%, titanium from about 0.03 to about 0.1%, a combined magnesium, copper and zinc content not in excess of about 0.15%, an iron content not in excess of about 0.3%, the total quantity of other impurities not exceeding about 0.15%, balance aluminum; and wherein the cladding consists of an AA 4XXX series aluminum alloy.

2. The core alloy of claim 1 wherein the combined magnesium, copper and zinc content of the alloy is not in excess of about 0.10%.

3. The core alloy of claim 1 wherein the titanium content is within the range from about 0.03 to about 0.07%.

4. The composite of claim 1 wherein the cladding is selected from AA 4047, 4147 and 4104 alloys.

5. The composite of claim 1 wherein the core alloy is in sheet form and it is clad on both sides with the cladding alloy.

6. The composite of claim 1, wherein the composite has been annealed and aged to O-temper condition.

* * * * *